United States Patent Office 3,597,476
Patented Aug. 3, 1971

3,597,476
PROCESS FOR PREPARING TRIS (2-MERCAPTOETHYLAMINO) PHOSPHINE OXIDES AND SULFIDES
Stephen Paul Edwards and Preston Houston Franke, Jr., Lake Jackson, Tex., assignors to The Dow Chemical Company, Midland, Mich.
No Drawing. Filed Dec. 4, 1968, Ser. No. 781,246
Int. Cl. C07f 9/22
U.S. Cl. 260—551                                    6 Claims

ABSTRACT OF THE DISCLOSURE

Compounds having the formula

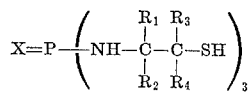

wherein X is oxygen or sulfur and $R_1$, $R_2$, $R_3$ and $R_4$ are hydrogen or lower alkyl, are prepared in the novel reaction comprising reacting by contacting $H_2S$ and a compound of the formula

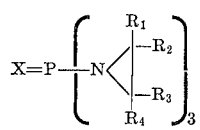

in the presence of a catalytic amount of an alkali metal hydrosulfide. The compounds are new curing agents for epoxy resins, and the cured resins thus produced are fire-retardant.

BACKGROUND OF THE INVENTION

Mercaptan-cured epoxy resins as a group are known to possess useful properties, such as flexural strength, etc. They have been generally prepared by reacting $H_2S$ or a di- or trimercaptan with an epoxy resin. The ideal properties for the di- or trimercapto reactant are low viscosity, low toxicity and activated SH groups which promote the reaction at less than about 100°C. and preferably at about room temperature. These properties have not generally been available in prior mercapto compounds. There have been a number of suitable known di- or trimercapto compounds which have low viscosity and low toxicity, such as dipentene dimercaptan, but they required a reaction temperature of at least about 100° C. to react with the epoxy resin. Those known mercapto reactants which were reactive at lower temperatures, such as those containing an aryl—$CH_2SH$ group, were generally toxic. The compounds of the present invention are low viscosity compounds containing active SH groups and are of low toxicity. Accordingly, use of the subject compounds in the preparation of the novel polymercaptans is considered a definite advance in the art.

SUMMARY OF THE INVENTION

It has now been discovered that compounds having the formula

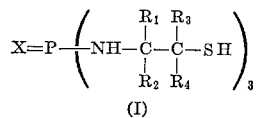

wherein X is oxygen or sulfur and $R_1$, $R_2$, $R_3$ and $R_4$ are hydrogen or lower alkyl, are prepared in the novel reaction comprising reacting by contacting $H_2S$ and a compound of the formula

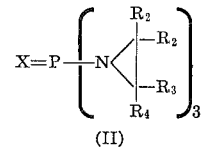

in the presence of a catalytic amount of an alkali metal hydrosulfide. The subject compounds are new curing agents for epoxy resins, and the cured resins thus produced are fire-retardant.

The discovery that $H_2S$ reacts with tris(aziridinyl)phosphine oxide or tris(aziridinyl)phosphine sulfide, hereinafter APO and APS respectively, and the alkyl-substituted derivatives of APO or APS to form the subject compounds was surprising in view of the fact that acids, and even water under some conditions, are known to cause homopolymerization of APO and APS. Even more surprising is the fact that only the mercaptoethyl derivative is formed since it is well known that mercaptans react with ethylenimine compounds to form sulfides, as illustrated by the following equation:

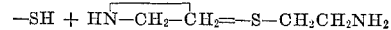

Accordingly, a plurality of products would be expected but are not found in the subject reaction.

The subject compounds are conveniently prepared in the novel reaction comprising reacting by contacting $H_2S$ with APO, APS or lower alkyl substituted APO or APS in the presence of a catalytic amount of an alkali metal hydrosulfide.

Suitable APO and APS reactants have the general Formula II above. The preferred reactants are those in the formula wherein X is oxygen and at least two of $R_1$, $R_2$, $R_3$ and $R_4$ are hydrogen. The most preferred reactants are APO and tris(2-methylaziridinyl)phosphine oxide. Examples of suitable APO and APS reactants include: APO, APS, tris(2-methylaziridinyl)PO, tris(2-ethylaziridinyl)PO, tris(2-amylaziridinyl)PO, tris(2,2-dimethylaziridinyl)PO, tris(2-ethyl-3-butylaziridinyl)PO, tris(2,-2-dibutylaziridinyl)PO, tris(2-hexylaziridinyl)PO, tris(2-propylaziridinyl)PS, tris(2-methyl-3-hexylaziridinyl)-PS, tris(2,3-dipropylaziridinyl)PS, and other like compounds; PO and PS above are phosphine oxide and phosphine sulfide respectively.

The catalyst should be present in catalytic quantities in the reaction and is advantageously generated in situ by introducing the alkali metal cation into the reaction mixture in the form of alkali metal lower alkoxide, such as those alkoxides containing 1 to about 4 carbon atoms. The alkali metal alkoxide then reacts with $H_2S$ to produce the desired catalyst and the corresponding alkanol. Examples of suitable catalysts include LiSH, NaSH and KSH. The concentration of $SH^-$ anion is thought to be rate determining in the reaction.

The reaction is preferentially conducted in a suitable inert solvent medium. Materials which are solvents for APO and APS constitute a known class and include lower alkanols, such as methanol, ethanol, etc., and heterocyclic compounds such as p-dioxane, and other like compounds.

The reaction temperature is suitably between about $-10°$ and about $50°$ C. and is preferably between about $0°$ and about $10°$ C. At temperatures below about $-10°$ C., the reaction rate is low. At temperatures above about $50°$ C., the product yield decreases and undesirable side reactions, such as polymerization, may occur.

Pressure on the reaction is suitably at least atmospheric and is preferably autogenous.

The ratio of H₂S to APO, APS or alkyl-substituted APO or APS compounds is suitably at least stoichiometric, i.e. 3 moles of H₂S per mole of APO or APS. Preferably, a molar excess of H₂S is used, e.g. 3–5 mole or more of H₂S per mole of APO or APS. Less than a stoichiometric amount of H₂S results in a lower ratio of —SH to total sulfur.

The reaction product is generally separated from the reaction mixture by stripping away the solvent and other volatiles under reduced pressure. During this procedure, the temperature of the mixture should be maintained between about —10° C. and about 30° C. and preferably between about 0° C. and 20° C. The alkyl-substituted products exhibit a tendency to polymerize under reduced pressure unless a low temperature is maintained.

The subject compounds are useful as curing agents for epoxy resins. The products resulting from the polymerization reaction between the subject compounds and an epoxy resin are new products. They are fire-retardant, solvent-resistant and high impact-resistant materials that are useful as laminates, foams, coatings, castings, and other obvious applications wherein they are cured in place.

The ratio of reactants in preparing the new cured resins may be varied to obtain (a) some particular rate of cure at a given temperature or, (b) a particular end property, such as hardness, flexibility, etc. suitably a stoichiometric ratio of thiol and epoxy is used. The resins may also contain one or more conventional ingredients which may or may not be functional, i.e. blowing agents, dyes, fillers, etc. Preferably, a catalytic amount of a conventional catalyst known to initiate the polymerization of epoxy resins is added, e.g. tris(dimethylaminomethyl)phenol, tetramethylguanidine, benzyldimethylamine.

In certain cases it may be desirable to include co-reactants from the class of amino compounds which contain active hydrogen. These then become part of the polymer structure, e.g. tetraethylenepentamine and aminoethylpiperazine.

Substantially any conventional epoxy resin can be cured by the new curing agents. Examples of suitable epoxy resins which may be cured with the inventive compounds include those having the formula

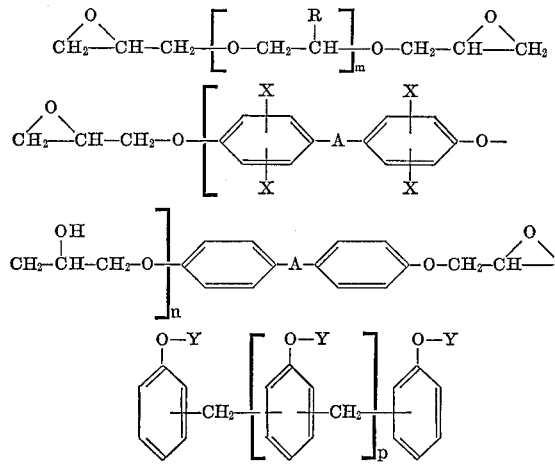

wherein A is lower alkylidene, —S—, —S-S—, —O—,

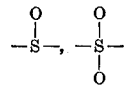

X is hydrogen or halogen and is preferably hydrogen or bromo, R is H or lower alkyl such as 1 to about 6 carbon atoms, Y is

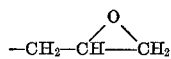

n is 0 to about 4, m is 0 to about 4 and p is 1 to about 6. Examples of suitable epoxy-containing compounds include diglycidyl ether, diglycidyl thioether, the reaction product between bisphenol A or brominated bisphenol A and epichlorohydrin, bis(glycidylphenyl) disulfide, epoxylated novolac resins, 1,2-diglycidyloxybutane, the reaction product between polypropylene glycol and epichlorohydrin, and other like compounds.

The cured resins are prepared by mixing the reactants at a temperature sufficient to initiate the reaction and maintain the reaction mixture at that temperature until the reaction is substantially completed. Suitable temperatures and times depend on the particular materials being used. In general, temperatures of about 10° C. to 90° C. are suitable. If a temperature as high as 50°–90° C. is used, gellation is allowed to occur at about 25° C. before the heat is applied.

SPECIFIC EMBODIMENTS

The following examples further illustrate the invention:

EXAMPLE 1

Preparation of O=P($NH$—$CH_2CH_2$—$SH$)$_3$

Into a small stainless steel kettle equipped with a pressure relief valve, pressure gauge, agitator, thermometer, addition ports, addition bomb and connectors were added 500 ml. of methanol, 150 ml. of dioxane and 2 g. of sodium methoxide. The temperature was lowered to about 0° C. and hydrogen sulfide was pressured into the kettle until 170 grams had been added. Then 165 grams of APO was added. The contents were stirred for about 1 hour at 0° C. The contents were permitted to gradually warm to room temperature and stand overnight. The contents were removed, neutralized with 6 grams of ethylene chlorohydrin, and placed in a rotofilm evaporator wherein the solvent was removed at 25° C. and 1 mm. Hg. The product analysis of the residue was as follows:

|    | Percent |
|----|---------|
| C  | 26.5    |
| H  | 7.9     |
| N  | 15.39   |
| S  | 30.10   |
| P  | 10.37   |
| SH | 30.75   |

EXAMPLE 2

Preparation of 

Using substantially the same procedure and ratio of reactants as described in Example 1 except that tris(2-methylaziridinyl)phosphine oxide (MAPO) replaces APO in the reaction, the compound $$O=P(NH—CH(CH_3)—CH_2—SH)_3$$

is prepared. The solvent is stripped off at a temperature between about —10° C. and about 10° C.

EXAMPLE 3

In a suitable container were mixed 55 grams of an APO-hydrogen sulfide product prepared as in Example 1 (except that the APO was added to the reactor as a solution in methanol) and 0.68 grams of benzyldimethylamine. Then 87.5 grams of a diglycidyl ether of bisphenol A (epoxide equivalent weight=EEW=175) was added at 60° C. After mixing, the mixture was poured into a mold to prepare test specimens of an approximate size of ½" x ½" x 6". The mold was allowed to stand at room temperature for 15 minutes before being placed in a 60° C. oven for 1 hour and then in a 90° C. oven for 30 minutes.

The properties of the cured resin were as follows:

Flexural strength, 14,760 p.s.i. _____ ASTM D790–59T.
Flexural modulus, 3.77×10⁵ p.s.i. __ ASTM D790–59T.
Izod impact 2.21 ft. lb. _____ ASTM D256–56.
Rockwell hardness, "M" 103 _____ ASTM E18–59T.
Heat distortion, 135° F. (57° C.) __ ASTM D648–56.

EXAMPLE 4

A conventional amine-cured epoxy resin coating formulation was prepared by mixing 66.5 parts by wt. (resin basis) of a commercially available epoxy resin in solution (i.e. a solid condensation product between bisphenol A and epichlorohydrin, which has an average EEW of about 525, as a 75% solution in a solvent comprising 65 parts by wt. of methyl isobutyl ketone and 35 parts by wt. of xylene), 27.85 parts of a solvent mix (240 parts by wt. of xylene, 130 parts by wt. methyl isobutyl ketone, 170 parts by wt. of 2-ethoxyethanol, and 17 parts by wt. of a commercially available organosilicone material designated as DC 840) and 2.5 parts by wt. of diethylenetriamine (DETA). This coating is referred to as coating No. 1 in the graph.

Several coatings formulations were prepared using various mercaptan-type curing agents by blending one equivalent weight of DER 337, which is a commercially available, low-melting, solid epoxy resin formed in the reaction between bisphenol A and epichlorohydrin having an average EEW of between 230 and 250, with one equivalent weight of the following mercaptan curing agents in the presence of a catalyst, i.e. tris(dimethylaminomethyl)phenol-1% by weight based on total weight of DER 337 and mercaptan. Such coating was compounded in a solvent medium of 240 parts by weight (p.b.w.) xylene, 130 p.b.w. methyl isobutyl ketone, 170 p.b.w. 2-ethoxyethanol and 17 p.b.w. DC 840.

Curing agent: Description
- A —— The reaction product between a commercially available novolac-based epoxy resin, having an average EEW between 172–179 and which is designated as DEN 438, and $H_2S$ having an SH equivalent weight of 236.
- B —— Dimercaptopropanol, SH equivalent weight of 72.
- C —— The reaction product of APO and $H_2S$ having an S Hequivalent weight of 107.

Each of the coatings evenly applied to Bonderite 100 steel panels and the Sward hardness (reported as a percent of the hardness of glass) of each was measured at intervals during several days of storage, i.e. at 1, 2, 3, 5 and 10 days at room temperature. The results are given in Table I.

TABLE I

| Coating | Curing agent (equivalents) | Sward Hardness | | | | |
|---|---|---|---|---|---|---|
| 1 | DETA | 20 | 27 | 30 | 32 | 33 |
| 2 | 0.2 A+0.8 B | 3.5 | 5.5 | 7 | 9 | 11 |
| 3 | 1.0 A | 8 | 11 | 13.5 | 17 | 20 |
| 4 | 1.0 C | 42 | 46 | 51 | 52 | 52 |

A coating similar to "4" above is prepared using the reaction product of Example 2.

EXAMPLE 5

By the procedure of Example 3, a specimen ⅛" thick was prepared and tested for flammability according to ASTM D-635-56T. The composition was self-extinguishing and an average of 4 tests were as follows:

Distance burned—0.9 in.
Burn time—15 sec.

It is therefore evident that the subject compounds are very useful as curing agents for epoxy resins, and that the thus cured polyester resins have obvious utilities based on their physical properties of hardness, fire-retardancy, and the like.

We claim:
1. A process of preparing a compound of the formula

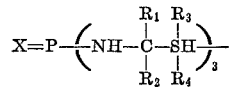

wherein X is oxygen or sulfur and $R_1$, $R_2$, $R_3$ and $R_4$ are hydrogen or lower alkyl, said process comprising reacting by contacting $H_2S$ and a compound of the formula

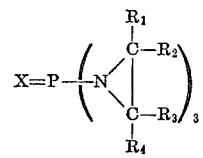

wherein $R_1$, $R_2$, $R_3$ and $R_4$ have the aforesaid meaning, in the presence of an alkali metal hydrosulfide.

2. The process defined in claim 1 wherein the reaction temperature is between about $-10°$ C. and about $50°$ C.
3. The process defined in claim 2 wherein the reaction temperature is between about $0°$ C. and about $10°$ C.
4. The process defined in claim 2 wherein at least two of $R_1$, $R_2$, $R_3$ and $R_4$ are hydrogen.
5. The process defined in claim 4 wherein X is oxygen.
6. The process defined in claim 5 wherein $R_1$ is hydrogen or methyl.

References Cited
UNITED STATES PATENTS
3,286,002   6/1963   Curtis et al. —————— 260—947

OTHER REFERENCES
Bestian, Tiebig's Annelen der Chemie, vol. 566, p. 210–43 (1950).

HARRY I. MOATZ, Primary Examiner

U.S. Cl. X.R.
260—239, 45.9, 79, 37, 47, 79.3

PO-1050
(5/69)

UNITED STATES PATENT OFFICE
CERTIFICATE OF CORRECTION

Patent No. 3,597,476          Dated 3 August 1971

Inventor(s) Stephen Paul Edwards and Preston Houston Franke, Jr.

It is certified that error appears in the above-identified patent and that said Letters Patent are hereby corrected as shown below:

In column 2, change the formula between lines 4 and 10 to read:

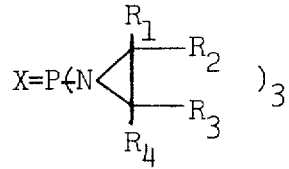

In Claim 1, column 6, change the formula between lines 16 and 21 to read:

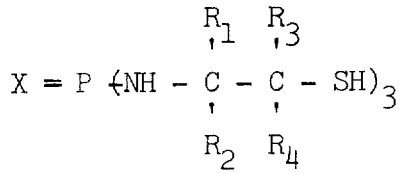

Signed and sealed this 28th day of December 1971.

(SEAL)
Attest:

EDWARD M. FLETCHER, JR.          ROBERT GOTTSCHALK
Attesting Officer          Acting Commissioner of Patents